United States Patent [19]

Hoffland

[11] Patent Number: 4,747,691

[45] Date of Patent: May 31, 1988

[54] METHOD AND APPARATUS FOR DILUTING AND ACTIVATING POLYMER

[76] Inventor: Robert O. Hoffland, 303 Silver Spring Rd., Conroe, Tex. 77303

[21] Appl. No.: 912,254

[22] Filed: Sep. 29, 1986

[51] Int. Cl.⁴ .............................................. B01F 15/04
[52] U.S. Cl. .................................... 366/160; 422/135
[58] Field of Search ............... 366/160, 161, 162, 241, 366/155, 307, 150, 151, 152, 154, 297; 422/134, 135

[56] References Cited

U.S. PATENT DOCUMENTS 2,917,465 12/1959 Begley .................................. 366/155
3,321,283 5/1967 Ewald .................................. 366/307
3,807,701 4/1974 Reid ...................................... 366/132
4,125,574 11/1978 Kastner ................................ 422/135
4,494,878 1/1985 Rainey ................................. 366/307
4,522,502 6/1985 Brazelton ............................ 366/160

Primary Examiner—Robert W. Jenkins
Attorney, Agent, or Firm—Guy E. Matthews

[57] ABSTRACT

This invention relates to a method and apparatus for diluting and activating a polymer in water. More particularly, the invention relates to the use of a stirred tank in conjunction with an aging tank that allows the polymer to uncoil or become activated in water after dilution, but prior to introduction into service.

8 Claims, 3 Drawing Sheets

METHOD AND APPARATUS FOR DILUTING AND ACTIVATING POLYMER

SUMMARY OF THE INVENTION

This invention relates to a method and apparatus for diluting and activating a polymer in water. More particularly, the invention relates to the use of a stirred tank in conjunction with an aging tank that allows the polymer to uncoil or become activated in water after dilution, but prior to introduction into service.

BACKGROUND OF THE INVENTION

Various synthetic and naturally occurring water-soluble polymers have been developed which exhibit excellent thickening and flocculating properties. These polymers are well known to the the art and have been described in numerous publications and patents. Most commonly used are acrylamide polymers which include polyacrylamide and its water-soluble copolymeric derivatives such as acrylamide-acrylic acid and acrylamide-acrylic acid salt which contains 95-5 percent by weight acrylamide. Copolymers of acrylamide with vinyl monomeric such as maleic anhydride, acrylonitrile, styrene and the like are also useful. Other useful water-soluble vinyl polymers are described in detail in U.S. Pat. Nos. 3,418,237; 3,259,570 and 3,171,805. The polymers are generally available in powder form but useful only when dissolved in water.

One method of use has been to first disperse the polymer in a carrier such as oil. The polymer is generally highly concentrated in the carrier and must be diluted to a concentration of approximately 8%-10% in water or other diluents before use. One method using an oil based carrier is disclosed in U.S. Pat. No. 3,624,019.

The polymers have molecular weights of up to 25,000,000. As such, they exist in the carrier in tight coils. The active sites for treatment of wastes are believed to be along the chain and in the coil form the polymers are not effective. In addition to being diluted, the polymers must also be allowed to uncoil to expose the active sites and activate the polymer.

Due to the size and length of these polymers, they must be mixed gently to prevent breaking up of the chains into smaller, less efficient particles. There is therefore, presented a problem in the mixing and dispersion of polymer in diluent. If the polymer becomes uncoiled during mixing, it can be broken up. Methods and apparatus have been designed to disperse the polymer gently in water—see for example, U.S. Pat. No. 4,522,502 where the inventor has gone to great lengths to design a mixing apparatus that will not break up the polymer during dilution and activation.

The apparatus as described in U.S. Pat. No. 4,522,502 has several drawbacks. One major problem as disclosed is that the combination impeller and nozzle arrangement causes vortexing in the mixing tank which prevents effective mixing. In particular, the placement of the nozzle closely adjacent to the impeller contributes to this problem. The addition of the mixing vanes helps to alleviate the problem but increases the shear forces on the polymer molecules which increase the possibility of break-up of the molecules. This problem would be overcome if the polymer did not age in the mixing chamber.

Other methods and apparatus for diluting polymer are disclosed in U.S. Pat. Nos. 4,217,145; 3,807,701; 4,218,147; 4,233,265; 4,125,574; 4,057,223; 3,186,803; 3,434,804 and 3,765,655. None of the above referenced patents disclose a particularly designed aging tank to allow the polymer to become activated after dilution.

OBJECTS OF THE INVENTION

In view of the above considerations, it is therefore an object of the present invention to provide a method and apparatus for efficiently diluting a polymer in water.

It is a further object of the invention to provide an apparatus that efficiently dilutes polymer in water without breaking the polymer particles.

It is another object of the invention to provide a method and apparatus that allows the polymer to be activated after mixing.

DESCRIPTION OF THE PREFERRED EMBODIMENT

Figure 1:
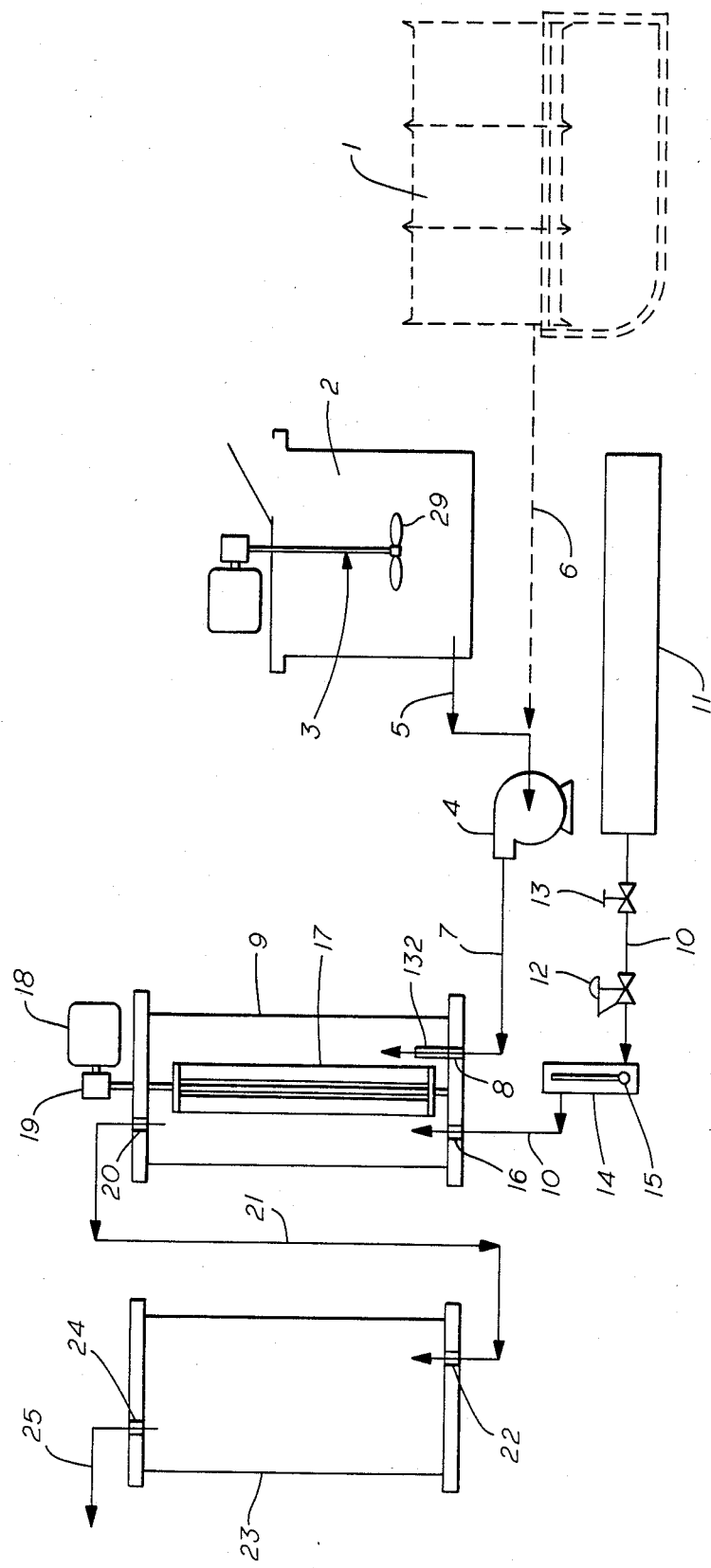
FIG. 1 is a simplified flow diagram of the invention.

Referring now to the figures where like numerals indicate like components, the preferred embodiment of the invention is shown. In FIG. 1, a general flow diagram of the invention, the polymer which is carried in an oil based liquid is stored in either a 55 gallon drum 1 or an agitated storage tank 2. As the polymer tends to settle out of the carrier, the agitated storage tank is preferred. The agitator in the tank 2 is generally shown at 3.

The suction of a metering pump 4 is connected by flowline 5 or 6 to the storage tank 2 or the 55 gallon drum 1, respectively. The polymer/carrier is metered and pumped through flowline 7 to the polymer inlet 8 of the mixing tank 9.

Water is provided by a delivery means which includes a flowline 10 connected to a pressurized water source 11, such as a city water system, to provide a continuous flow of water. Pressure regulator 12 and valve 13 are provided in the flowline 10 to maintain pressure and provide a positive shut off of the water flow.

A rotameter 14 is included in the flowline 10 to accurately measure the water flow. The rotameter 14 includes a needle valve 15 to adjust the water flow rate. Flowline 10 is connected to the water inlet 16 and mixing tank 9.

The mixing tank 9 has an agitator 17 which is driven by an electric motor 18 through direct drive 19. The water and polymer/carrier enter the mixing tank through inlets 16 and 8, respectively, and are mixed together by the agitator 17 such that the polymer is adequately dispersed in the water.

The continuous flow of water carries the diluted polymer by pressure from source 11 through the mixing tank where it exits near the top at the outlet 20 into flowline 21 which carries it to the aging tank 23 where it enters near the bottom at the inlet 22. The continuous flow of diluted polymer then exits the aging tank at outlet 24 to flowline 25 where it is carried to the desired service.

The volume of the mixing tank 9 and aging tank 23 are selected based upon the amount of polymer required and dilution desired. Usually, the water flow is greatly in excess of polymer/carrier and determines the residence time in each tank—residence time being simply the volume of water per unit time divided by the volume of each chamber. The volume of the mixing tank 9 is selected to achieve maximum dispersion of polymer in the water, but such that it does not allow enough time for the polymer to uncoil (become activated) and thus prevent breakage by the shearing forces of the agitator 17. To provide activation of the polymer, the volume of the aging tank 23 should be at least equal to the volume of the mixing tank 9.

As presently practiced, the dimensions of the mixing tank 9 and aging tank 23 are 6 inches inner diameter and 15 inches high. This results in a volume of 1.83 gallons each. Experimentation has shown that a minimum flow rate of 50 gallons per hour is necessary to insure adequate mixing. This flow rate results in a residence time of 2.20 minutes in each tank 9 and 23. A flow rate of 100 gallons per hour results in better mixing but results in a residence time of 1.10 minutes in each tank. Any flow rate between 50–100 gallons per hour achieves the desired mixing and aging combination.

Figure 2:
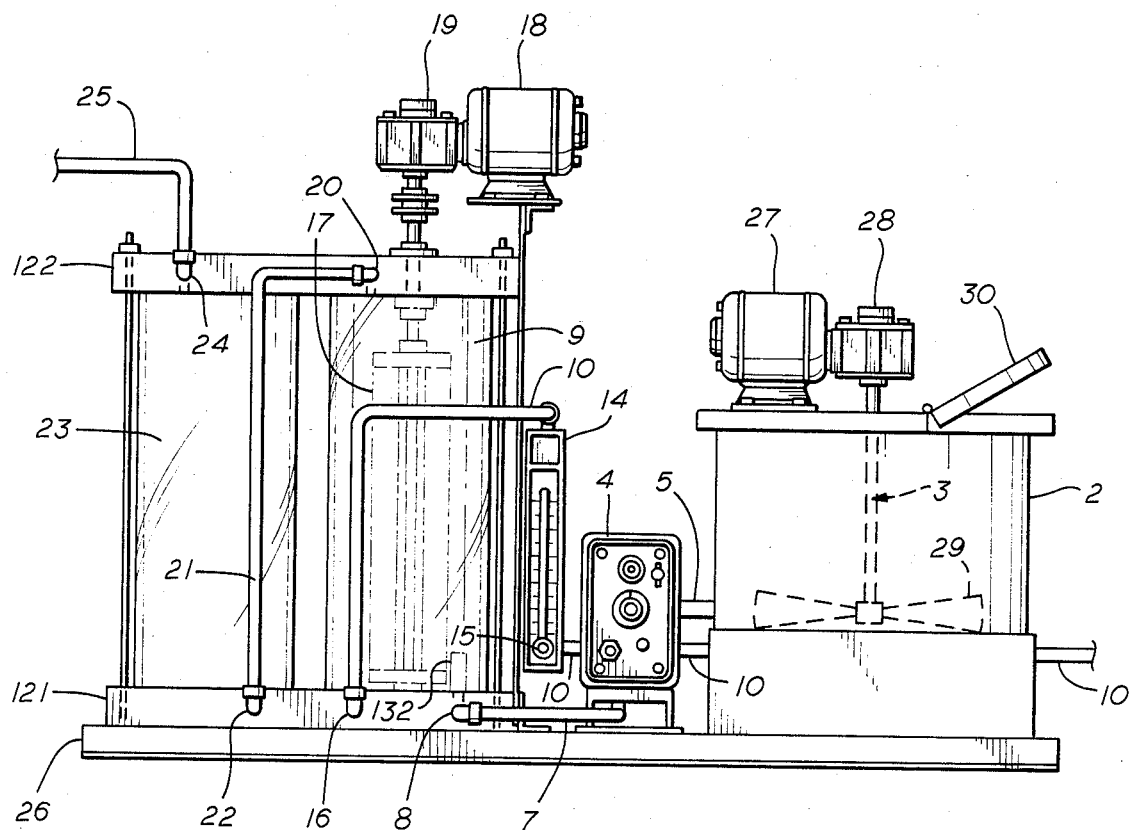
FIG. 2 is a side elevational view of the present invention as mounted on a skid.

FIG. 2 shows the arrangement of the present invention as mounted as a unit on a skid 26. The agitated storage tank is shown at 2 which is mounted at an elevation above the pump 4 so that a positive suction pressure is always provided to prevent cavitation of the pump. The arrangement of the rotameter 14, mixing tank 9 and aging tank 23 are for convenience for piping the flowlines 5, 7, 10, 21 and 25. The agitated storage tank 2 is shown with a lid 30 to provide access to add the polymer/carrier and a paddle 29 driven by motor 27 through direct drive 28.

Figure 3:
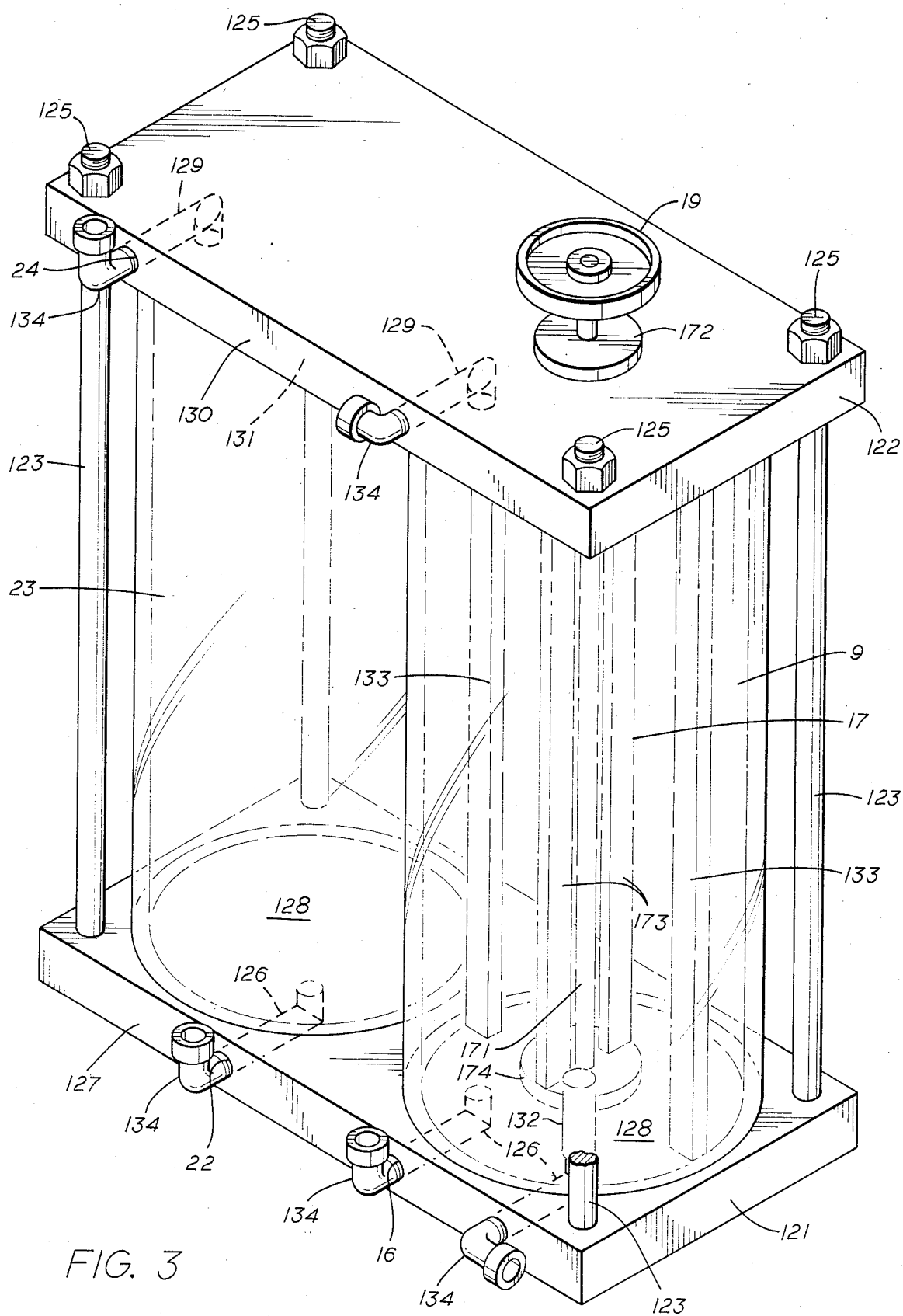
FIG. 3 is a detailed drawing of the mixing tank and aging tank of the present invention.

Referring now to FIG. 3, more detail of the mixing tank 9 and aging tank 23 are shown. For convenience, both are mounted on a single solid base 121 with a single solid lid 122, both shown as rectangular solids. Each of the tanks are cylindrical, preferably made of a clear acrylic plastic. Where each of the cylinders are joined to the base and lid, O-ring types seals (not shown) are used to provide a tight liquid seal. The base 121 and lid 122 are joined by rods 123 having bolts 125 or other suitable fasteners threaded onto each end to force the lid 122 and base 121 into contact with seals (not shown) and make a liquid tight seal between the tanks 9 and 23 and the base 121 and lid 122.

The base 121 has internal passageways 126 providing openings from one face 127 to the top surface 128 within each of the tanks. Likewise, the lid has passageways 129 between face 130 to the bottom surface 131 of the lid within each of the tanks.

Connections 134 are threaded into the face openings of each of the passageways for connections to the flowlines. A check valve 132 is provided in the passageway comprising the polymer inlet 8 where the passageway enters the mixing tank 9. The check valve allows fluid to flow only into the tank which prevents backflow of the polymer into flowline 7 when the pump is shut off.

The mixing tank has internal baffles 133 spaced about the walls. Each of these baffles extend longitudinally for the entire length of the tank and extend radially inward for approximately 1/12 of the diameter of the tank. These baffles prevent vortexing of the liquid within the tank during agitation.

Mixing tank agitator, shown generally at 17, comprises a shaft 171 along the central axis connected to the direct drive 19 through the lid 122. Standard shaft sealing means 172 prevent liquid from leaking around the shaft. Shaft 171 has paddles 173 attached by bases 174 (bottom base only shown for illustration purposes) to the top and bottom. Bases space the paddles away from the shaft a distance to provide internal mixing and the necessary shear to insure complete dispersion of the polymer within the water. While only two baffles 133 and two paddles 173 are shown for illustrative purposes, four each are preferred.

Individual paddle dimensions which have been found to provide efficient mixing are 10 inches high and 1½ inches wide. The paddles 173 are spaced ¼ inch from a ½ inch shaft 171. The paddles 173 are rotated by the motor 18 through the drive 19 at 350 rpm with satisfactory mixing occurring at drive rate of 100–450 rpm.

The metering pump 4, check valve 132, regulator 12, valve 13 and agitator 3 are all standard equipment and are readily available as are the fittings 134, seals 172, electric motors 27 and 18 and drive unit 19.

In operation and as illustrated in FIGS. 1, 2 and 3, the concentrated polymer and carrier is loaded into the agitated storage tank 2 and the agitator 29 started by starting the agitator motor 27. Alternatively, the suction line 6 from the metering pump 4 may be connected to a 55 gallon drum 1 of the concentrated polymer and carrier. The water delivery line 10 is connected to a suitable water source 11 such as a pressurized city water supply. The valve 13 is open fully to supply water pressure to the system. The needle valve 15 on the rotameter 14 is then opened and adjusted to achieve the desired water flow rate. This allows the water to flow on through line 10 and water inlet 16 into the mixing chamber 9.

When the mixing chamber 9 is filled with water, water flows out of the outlet at the top of the mixing tank through flowline 21 and into aging tank through inlet 22. Finally, when the aging tank 23 is completely filled with water, water flows through outlet 24 into flowline 25 and to the service. When a desired flow rate if water of between 50 and 100 gallons is established, the agitator 17 in the agitation tank 9 may be started by starting the electric motor 18. The flow of the concentrated polymer and carrier can now be started by starting the metering pump 4 and setting it at the desired flow rate to obtain the desired dilution. The metering pump 4 takes suction from the agitator storage tank 2 through the suction line 5 or from the 55 gallon drum 1 through suction line 6 and pumps the concentrated polymer and carrier at precise predetermined rates through discharge line 7 and then through the polymer inlet 8 and then check valve 132 into the agitated mixing chamber where it is completely dispersed with the water by the action of the agitator 17 and the baffles 133.

The diluted polymer is then carried by the water through the outlet 20 into flowline 21 and into the aging tank 23 through inlet 22. The volume of the aging tank is such that the residence time of the diluted polymer is from 1.1 to 2.2 minutes which allows the polymer to become uncoiled and expose the active sites to become activated. Finally, the activated diluted polymer flows through outlet 24 along with the water through flowline 25 to the service where it may be injected in the water treating facilities.

It should be realized that the above description is only one embodiment of the invention and minor modifications may be made which still lie within the scope of the invention as defined by the appended claims.

What is claimed is:

1. An apparatus for continuously diluting and activating a concentrated polymer/carrier in water comprising:
   (a) a storage tank for containing the polymer/carrier;
   (b) an agitated mixing tank for mixing and diluting said polymer/carrier with water to be utilized in treatment of waste water, said mixing tank having a polymer inlet means, a water inlet means, and a mixing tank outlet means;
   (c) a polymer delivery means for continuously delivering said polymer/carrier from said storage tank to said polymer inlet means at precise delivery rates;
   (d) a water delivery means for continuously providing water to said water inlet means at desired flow rates;
   (e) an aging tank for activating said polymer after dilution in the water; and
   (f) a means for continuously delivering the diluted polymer to said aging tank.

2. The apparatus of claim 1 wherein said storage tank comprises an agitated storage vessel having an agitation means to disperse said polymer within said carrier.

3. The apparatus of claim 1 wherein said mixing tank comprises:
   (a) a substantially cylindrical chamber;
   (b) a plurality of longitudinal rectangular baffles attached to the inner walls of said chamber, each of said baffles extending radially inward for substantially 1/12 of the diameter of said chamber;
   (c) a rotatable mixing means disposed along the central axis of said chamber; and
   (d) a means for rotating said mixing means.

4. The apparatus of claim 3 wherein said mixing means comprises a central shaft disposed along the central axis of said chamber and a plurality of rectangular paddles in spaced relation to said shaft and extending for substantially the entire length of said shaft.

5. The apparatus of claim 1 wherein said polymer delivery means comprises a metering pump having a suction flowline connected to said storage tank and a discharge flowline connected to said polymer inlet means.

6. The apparatus of claim 1 wherein said water delivery means comprises:
   (a) a connection means and water delivery line, said water delivery line being connected by said connection means to suitably pressurize water source;
   (b) pressure regulator in said water delivery line to assure constant pressure; and
   (c) a rotameter having a needle valve in said water delivery line for measuring and controlling the rate of water delivery.

7. The apparatus of claim 1 wherein said aging tank comprises a substantially cylindrical chamber having a volume substantially equal to the volume of said mixing tank.

8. A method for continuously diluting and activating a concentrated polymer/carrier in water comprising the steps of:
   (a) providing a separate storage tank, mixing tank, and aging tank, said storage tank containing the concentrated polymer/carrier to be diluted and activated;
   (b) agitating the concentrated polymer/carrier in the storage tank to insure even distribution of the polymer in the carrier;
   (c) continuously moving the polymer/carrier at precisely controlled rates into the mixing tank;
   (d) continuously injecting water at controlled rates into the mixing tank and agitating the polymer/carrier and water to insure dispersion of the polymer/carrier in the water, such rate of water injection thereby obtaining the desired dilution of polymer/carrier and water; and
   (e) continuously moving the water and polymer/carrier from the mixing tank to the aging tank wherein the water and polymer/carrier mixture ages, thereby activating the polymer in the water.

* * * * *

Disclaimer 4,747,691.—*Robert O. Hoffland*, Conroe, Tex. METHOD AND APPARATUS FOR DILUTING AND ACTIVATING POLYMER. Patent dated May 31, 1988. Disclaimer filed May 11, 1990, by the inventor.

Hereby enters this disclaimer to claims 1 through 8 of said patent.
[ *Official Gazette October 9, 1990* ]